United States Patent [19]

Baron et al.

[11] Patent Number: 4,635,187

[45] Date of Patent: Jan. 6, 1987

[54] CONTROL FOR A MULTIPROCESSING SYSTEM PROGRAM PROCESS

[75] Inventors: Donna M. Baron, Joliet; David E. Espenlaub, Carol Stream; Vicki A. Haines, Wheaton; Gerald A. Inberg, Naperville; Steve A. Shilling; James B. Truesdale, both of Wheaton; Robert J. Willett, Winfield, all of Ill.

[73] Assignee: AT&T Bell Laboratories, Murray Hill, N.J.

[21] Appl. No.: 563,255

[22] Filed: Dec. 19, 1983

[51] Int. Cl.⁴ .............................................. G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,566,368 | 2/1971 | De Blauw | 364/200 |
| 3,656,123 | 4/1972 | Carnevalz et al. | 364/200 |
| 3,736,567 | 5/1973 | Lotan et al. | 364/200 |
| 4,296,492 | 10/1981 | Hafer | 370/14 |

FOREIGN PATENT DOCUMENTS 57-106926  7/1982  Japan .

OTHER PUBLICATIONS

H. Katzman, Jr., "Operating Systems", Van Nostrand Reinhold Company, 1973, pp. 315-360.
M. E. Grzelakowski, J. H. Campbell, and M. R. Dubman, "The 3B20D Processor & DMERT Operating System: DMERT Operating System", *The Bell System Technical Journal*, vol. 62, No. 1, Jan. 1983, pp. 303-322.
R. W. Watson, "Timesharing System Design Concepts," McGraw-Hill Book Company, 1970, pp. 137-157.
C. W. Gear, "Computer Organization and Programming," McGraw-Hill Book Company, 1980, pp. 108-115.
E. I. Organick, "The Multics System: An Examination of Its Structure", The MIT Press, 1972, pp. 303-311.

*Primary Examiner*—David Y. Eng
*Attorney, Agent, or Firm*—Kenneth H. Samples; Werner Ulrich

[57] ABSTRACT

In a multiprocessing system, a method of efficiently maintaining a program process active while also ensuring that the process is deactivated when no longer needed. One or more subordinate processes are linked to a controlling process. Each subordinate process has an associated overall timer. As long as the controlling process keeps sending periodic keep-alive messages to a subordinate process, the associated overall timer is prevented from timing out. When the controlling process stops sending keep-alive messages, the associated overall timer times out and the subordinate process is deactivated.

18 Claims, 8 Drawing Figures

NOTE -
  PROCESSOR 1 EXECUTES TEST CONTROL PROCESS
  PROCESSOR 2 EXECUTES INTERMEDIATE PROCESS
  PROCESSOR 3 EXECUTES LINE PROCESS

PROCESS CHAIN AND TIMING MEMORY LAYOUT
IN PROCESS CONTROL BLOCK

MESSAGE LAYOUT

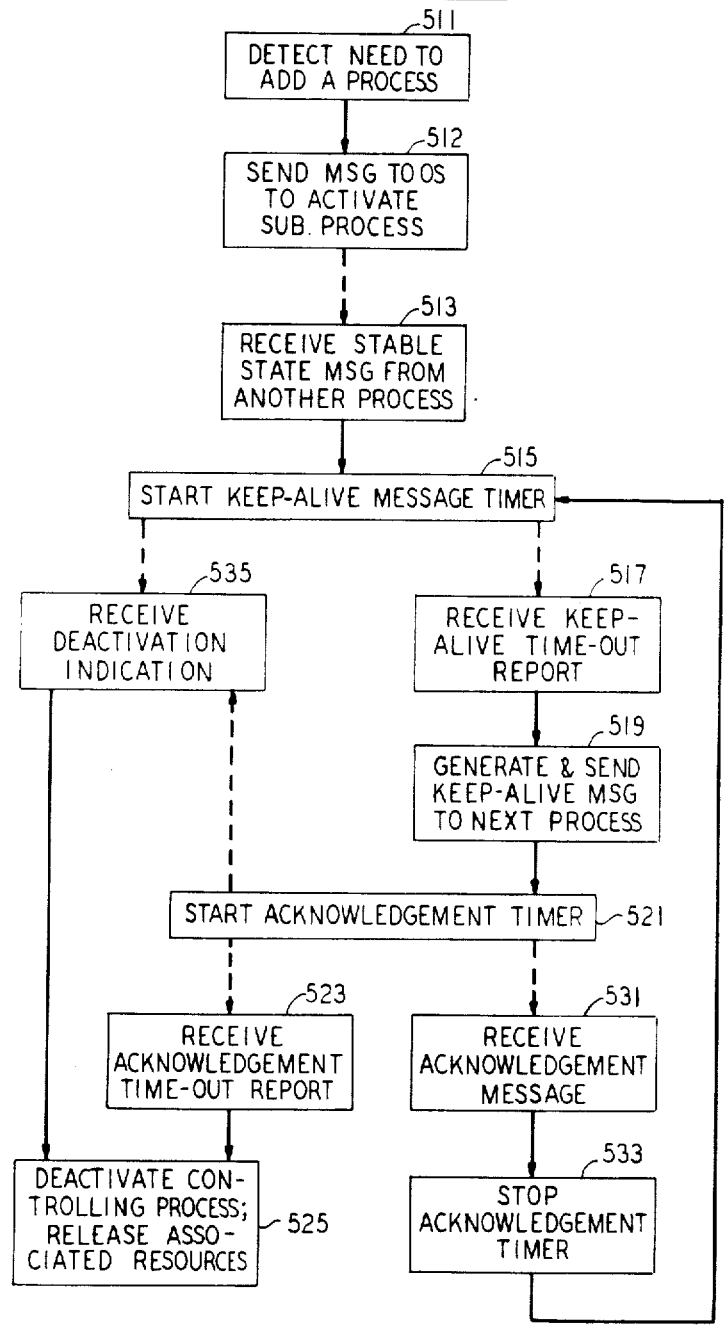

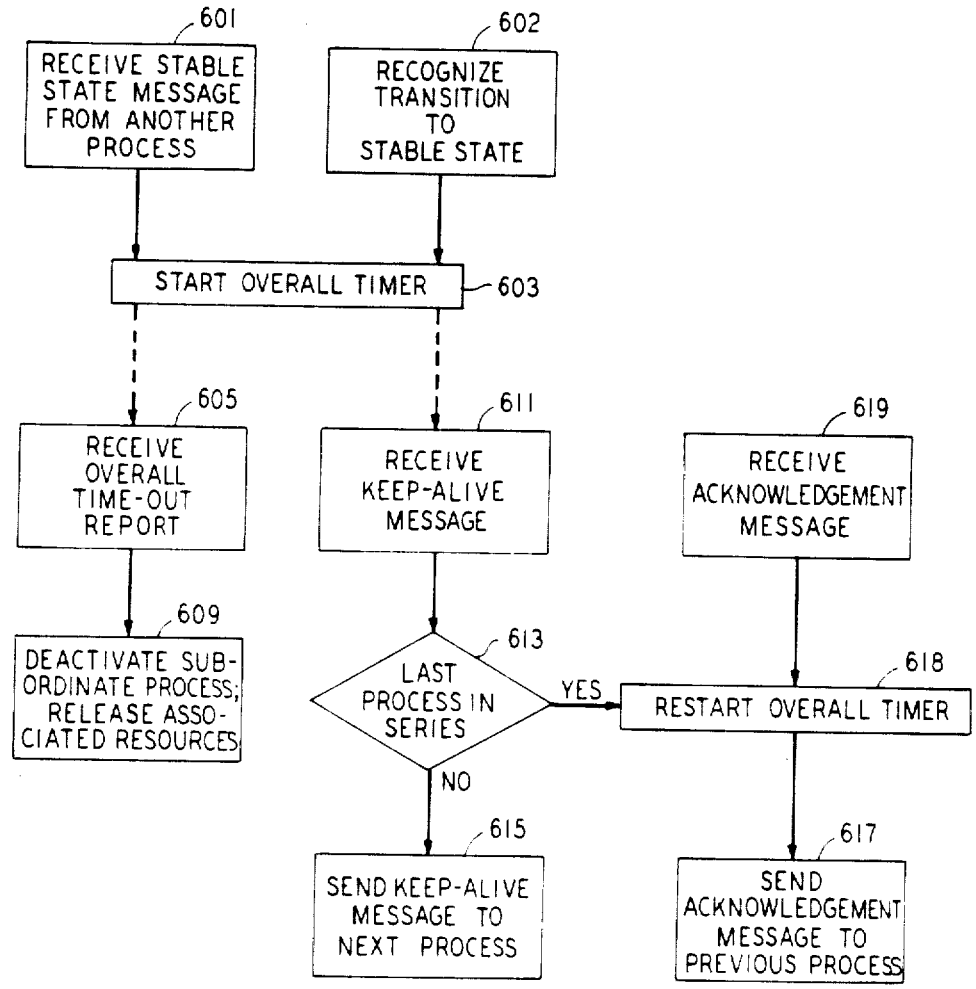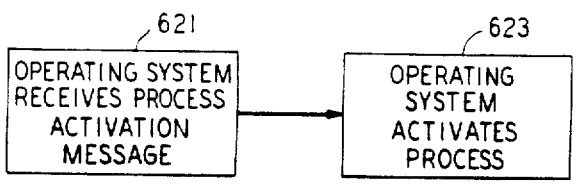

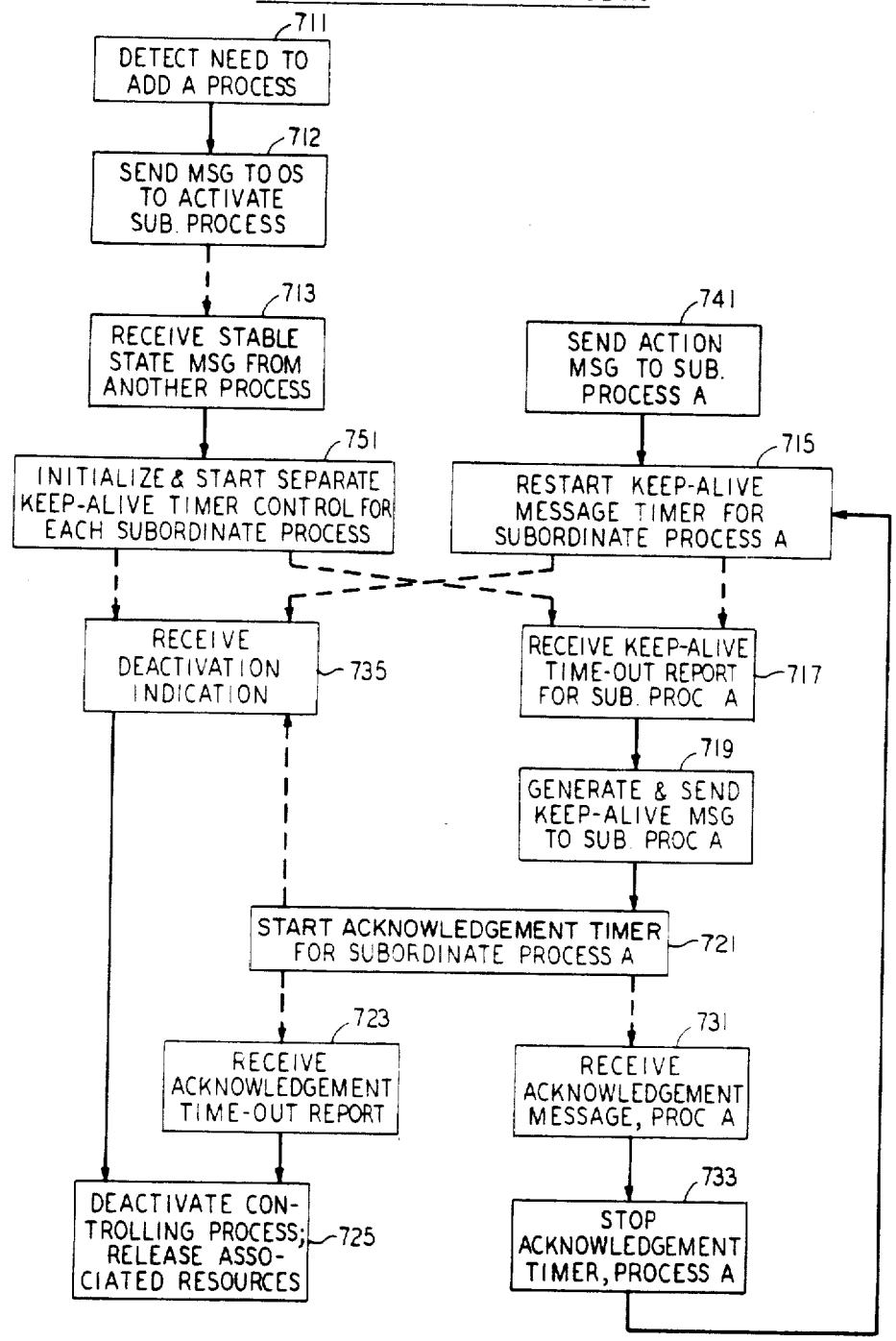

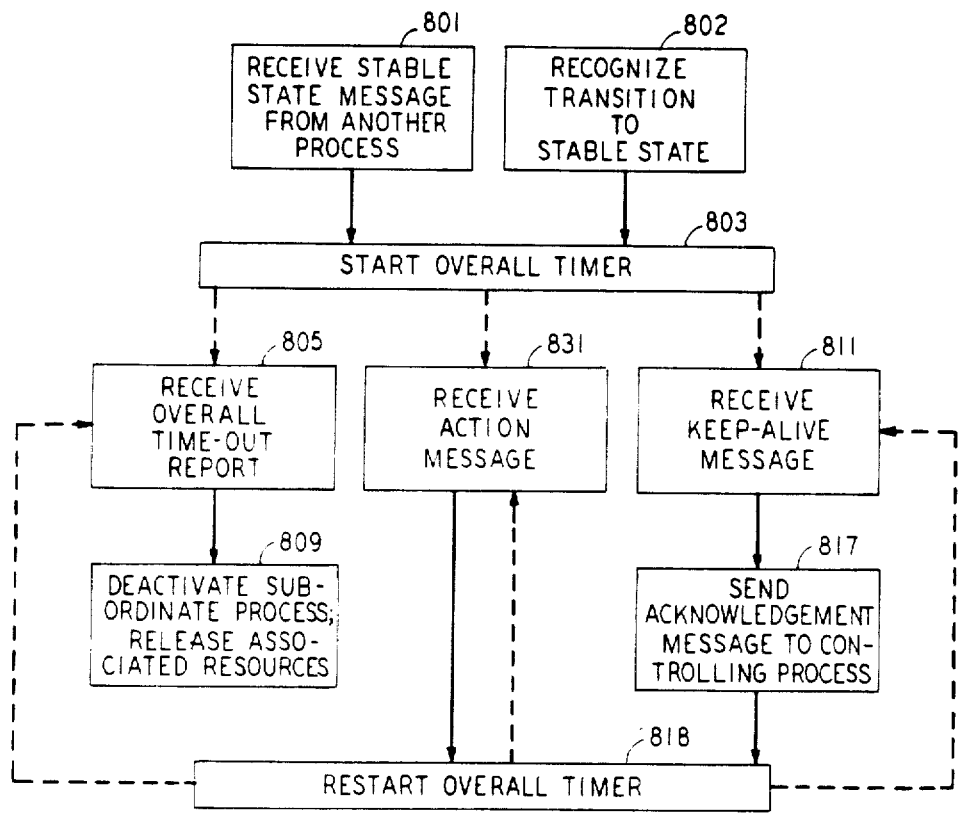
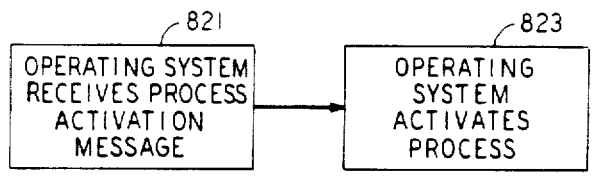
FIG. 8
ALTERNATE SUBORDINATE PROCESS TIMING AND MESSAGE HANDLING

CONTROL FOR A MULTIPROCESSING SYSTEM PROGRAM PROCESS

TECHNICAL FIELD

This invention relates to multiprocessing systems and more specifically, to the control of the individual program processes of such systems.

BACKGROUND OF THE INVENTION

A data processing system carries out its overall objective by executing a number of tasks called program processes. Every active program process makes some system resources unavailable to other program processes. In order to release such system resources and make them available for other uses, it is important that a program process be deactivated and its system resources released when there is no longer a need for that program process to remain active.

Some program processes are constructed so that they are automatically protected against remaining falsely active. For example, in the telephone switching system described in E. H. Hafer, U.S. Pat. No. 4,296,492, the activity of each communication path is monitored through the use of a path monitor signal. The need for continued activity of any active program process associated with a given communication path is determined by comparing the activity of the communication path with the process activity.

Program processes are also frequently prevented from remaining falsely active in a transient state through time-out mechanisms. If a predictable event, indicating that further data to be processed by the program process has been generated, does not occur within a specified timing interval, the process is deactivated and its associated resources released. For example, in a telephone system, if a program process, controlling the analysis of the digits of an incoming call received from a connected telephone office, fails to receive any such digits within a predetermined period of time, the program process times out and releases the digit receiver assigned to that call.

For program processes which have entered a stable state in which no predictable event will necessarily occur within some predetermined interval of time, it is more difficult to guard against a falsely active process. Under these circumstances, complex audit program processes can be used to check for the presence of falsely active program processes. The audit program processes examine each active program process to determine whether the task performed by that process is still required. When an active process is found which is intended to perform an unneeded task, that process is deactivated.

Such audit program processes perform a complex analysis of states of several program processes to determine whether a given process is legitimately active. The design of such audit program processes is a complex task, fraught with possibilities for error or oversight. Further, audit program processes consume system resources so that a balance must be struck between unavailability of system resources because of program processes that are falsely active and unavailability of system resources through the execution of audit program processes.

In view of the foregoing, a recognized problem in the art is that no efficient method exists of maintaining legitimately active program processes active, but automatically deactivating program processes that are needlessly keeping system resources unavailable.

SUMMARY OF THE INVENTION

In accordance with the present invention, in a multiprocessing system, a keep-alive message is sent to a program process to temporarily prevent that program process from being deactivated. An overall timer, set to time out after a predetermined period, is started for that program process and is restarted in response to the keep-alive message. If the overall timer was most recently started more than that predetermined period in the past, the process is deactivated. Advantageously, this method efficiently maintains legitimately active program processes in the active state and automatically deactivates program processes that are no longer needed.

In accordance with one aspect of the invention, in a system in which a controlling program process controls one or more subordinate program processes, a subordinate program process has an associated overall timer. The overall timer associated with the subordinate process is initially started when the subordinate process reaches a stable state. A keep-alive message is sent by the controlling process to the subordinate process. Reception of the keep-alive message by the subordinate process restarts the overall timer associated with the subordinate process. In the absence of keep-alive messages, the associated overall timer times out and the subordinate process is deactivated. Keep-alive messages are generated periodically, the period being shorter than the overall timer period. Advantageously, keep-alive messages need only be generated and received when the subordinate process is to be kept active for a period longer than the first overall timing interval. This overall timing interval may be selected to be longer than the typical period that a subordinate process remains active in order to minimize the number of keep-alive messages which must be generated, sent, and received.

In accordance with one embodiment of the invention, a group of cooperating program processes is linked together in a sequence, such that every process except the last has a next process and every process except the first has a previous process. Keep-alive messages are generated by the first process and are sent from each process to the next process in the sequence until the keep-alive message is received by the last process. In response to the keep-alive message, the last process transmits an acknowledgement message to its previous process. Acknowledgement messages are returned through the sequence of linked processes in the reverse direction to the direction of transmission of the keep-alive messages, i.e., from each process to the previous process. An overall timer is initially started for each of the linked processes, and a keep-alive message timer having a time-out period shorter than the time-out period of the overall timer(s) is initially started for the first process. Subsequently, a keep alive message is sent by the first process when the keep-alive message timer times out. The overall timer for a given process is restarted when the acknowledgement message is received from the next process, or, in the case of the last process, when a keep-alive message is received. When the overall timer associated with a given process times out prior to being restarted, the given process is deactivated. The keep-alive message timer for the first process is restarted when the first process receives an acknowledgement message, to prepare to send another keep-alive message. Advantageously, in this arrangement, the receipt by the first process of an acknowledgement message verifies the activity of all the cooperating processes and the linkages in both directions.

BRIEF DESCRIPTION OF THE DRAWING

The invention may be better understood from the following description when read with reference to the drawing in which:

FIGS. 5 and 6 show the process timing and message handling actions performed by a controlling process and by subordinate processes using keep-alive and acknowledgement messages; and FIGS. 7 and 8 show the process timing and message handling actions performed by a controlling process and by subordinate processes using keep-alive, acknowledgement and action messages.

DETAILED DESCRIPTION

A data processing or digital control system includes one or more processors. These processors typically include a central processing unit and a memory. A program, stored in the memory of a processor, includes a collection of instructions. Each instruction directs the execution of an elemental step by the central processing unit, so that the collection, when executed, accomplishes some system task. A program process or process is a program and associated data storage for carrying out a task. If a system has more than one process concurrently active, it is called a multiprocessing system. If a system has more than one processor capable of executing a process, it is called a multiprocessor or distributed processing system.

Modern data processing systems frequently contain a master control program called an operating system. The operating system provides common services to the individual program processes of the system. These services include timing, scheduling of the execution of individual program processes, and control of the sending and receiving of data messages among individual processes of the system. The operating system directs the performance of system tasks by activating and deactivating program processes in response to requests from program processes. In a distributed processing system, each processor usually has its own operating system. An operating system is associated with a process when the process and the operating system execute on the same processor.

An active program process has an associated area of memory, called a process control block, containing basic control information for that process such as the process number, timing control data, and linkage data required to link the process to other processes.

In the present embodiment, a program process is activated when the operating system associated with the process assigns memory for storing the data of the process and assigns other resources to the process as needed. Similarly, in the present embodiment a process is deactivated when the operating system associated with the process makes memory and other resources associated with the process available for use by other processes or releases such resources.

Sometimes a number of program processes cooperate on performing one larger task. One of these processes frequently acts as a controlling process and the other processes are subordinate processes. The controlling process has primary responsibility for initiating the activation and deactivation of the individual subordinate processes. For example, consider a system in which each program process controls one system resource. In such a system, when an individual system resource is required, a controlling process requests its associated operating system to activate a subordinate process or to send a message to cause another operating system to activate a subordinate program process. A controlling process may also send messages requesting the deactivation of subordinate processes.

Figure 1:
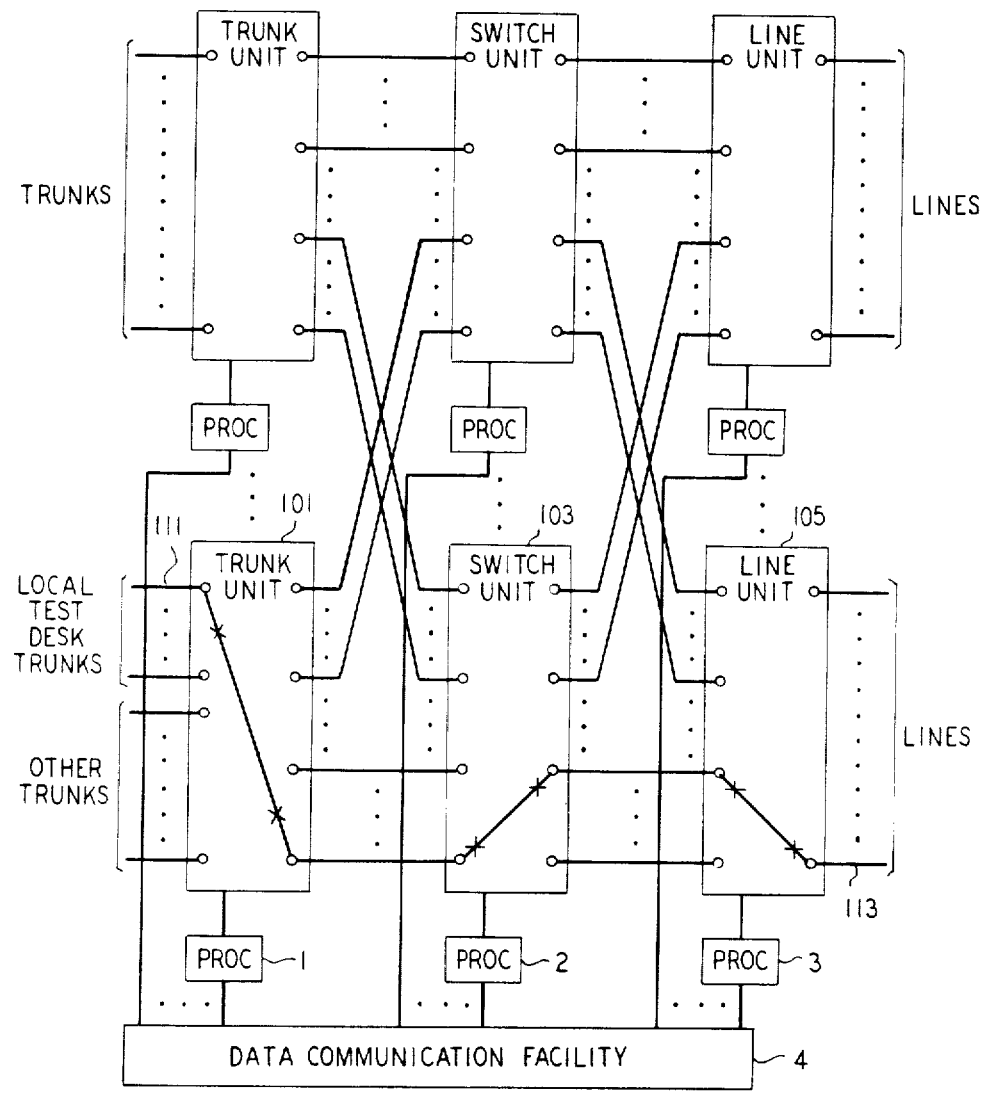
FIG. 1 shows a test connection in a telephone system and shows different program processes controlling different parts of the test connection.

FIG. 1 illustrates one specific call configuration in a telephone switching system having a distributed multiprocessing system as its processor system. Individual program processes in this system are associated with individual connections within the telephone switching system. In this call configuration, a customer telephone line 113 is switchably connected to a trunk 111 which is connected to a local test desk (not shown). A maintenance craftsperson at the local test desk can perform tests on telephone line 113 and observe the results. Although a more complete network is illustrated in FIG. 1, only trunk unit 101, switch unit 103 and line unit 105 are used in the illustrated call configuration.

In the call configuration of FIG. 1, line 113 is connected to local test desk trunk 111 through a line unit 105, a switch unit 103, and a trunk unit 101. The connection through trunk unit 101 is controlled by a test control process 201 (FIG. 2) executed on a processor 1, that through switch unit 103 by an intermediate process 203 (FIG. 2) executed on a processor 2, and that through line unit 105 by a line process 205 (FIG. 2) executed on processor 3. Processors 1, 2, and 3 communicate via data messages sent over data communication facility 4. Data communication facility 4 can be any commercially available data communication facility for interconnecting a group of processors.

Requests to set up or tear down any individual part of the total connection are initiated by test control process 201, the controlling process, which in turn is controlled by the actions of the maintenance craftsperson at the local test desk. Intermediate process 203 and line process 205 are subordinate processes that are activated and deactivated under the control of control process 201. Test control process 201, intermediate process 203, and line process 205 are linked by linkage data stored in the process control blocks of each of the three processes. The linking of processes is described in greater detail hereafter.

Line process 205 controls connections to line 113, which is the line currently being tested. As long as line process 205 remains active, line 113 is prevented from originating or receiving telephone calls. If for some reason line process 205 is allowed to remain indefinitely active, even after the maintenance craftsperson has completed testing, line 113 would be indefinitely denied service. One objective of the present invention is to minimize the chance that this will occur.

In accordance with the present embodiment, the subordinate processes, i.e., intermediate process 203 and line process 205, each have an associated overall timer controlled by the operating system of the processor executing that process. When either of these overall timers time out, the associated process is deactivated and its resources are released and made available for use by other processes. In order to prevent such a time-out, test control process 201 (FIG. 2) periodically sends a keep-alive message 211 (FIG. 2) to intermediate process 203 which forwards a keep-alive message 213 to line process 205. The keep-alive message is sent whenever a keep-alive message timer associated with test control process 201 times out and there is a continuing need for the subordinate processes. Line process 205 is the last process of the linked sequence of processes. As the last process, upon receipt of keep-alive message 213, line process 205 restarts its associated overall timer and sends an acknowledgement message 215 back to intermediate process 203. Upon receiving acknowledgement message 215, intermediate process 203 restarts its associated overall timer and sends acknowledgement message 217 back to test control process 201. The receipt by test control process 201 of acknowledgement message 217 is an indication that the three associated processes of the present embodiment are properly linked and still active. Test control process 201, the first process of the linked sequences of processes, then restarts the keep-alive message timer to prepare to send the next keep-alive message. The keep-alive message or the combination of keep-alive and acknowledgement messages are sent for the specific purpose of inhibiting an overall timeout in a receiving process, although it also possible to send additional data with such messages.

As described above the keep alive and acknowledge message sequence is the only arrangement used to deactivate processes. It should be noted that this sequence can also be used in conjunction with other methods of deactivating processes. For example, a system might be constructed in which the controlling process sends a deactivation message to a subordinate process when the subordinate process is no longer needed. The subordinate process should respond to a deactivation message by undergoing the deactivation process. However, the deactivation message may be mutilated or not arrive at the subordinate process and the subordinate process will remain active. Use of the keep-alive and acknowledgement message sequence in conjunction with the deactivation message method provides a fail safe method to ensure that subordinate processes are eventually deactivated.

Figure 3:
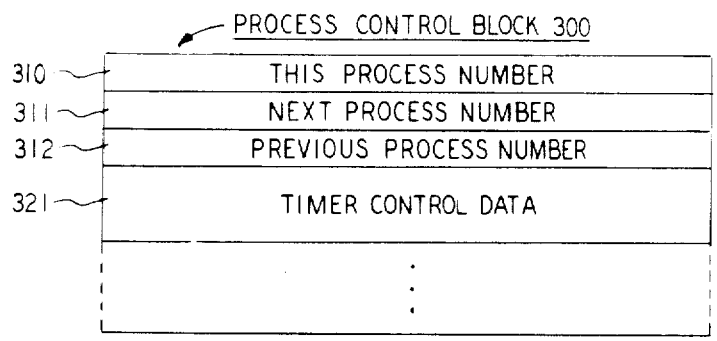
FIG. 3 shows a memory layout of part of a process control block.

FIG. 3 is a memory layout diagram of a typical process control block 300 of the present embodiment. The process control block 300 includes a process number 310 which identifies the process associated with process control block 300. The process control block also includes linkage data for linking the process to other processes. The linkage data includes the process number of the next process in the linkage 311 and the process number of the previous process in the linkage 312. The first process of the sequence, test control process 201, has no previous process, therefore its previous process number is blank. Similarly, the last process of the sequence, line process 205, has no next process, so its next process number is blank. A process can determine the destination for keep-alive and acknowledgement messages by simply reading the next process number or previous process number respectively from its associated process control block 300. Process control block 300 also contains timer control data (location 321) which is described in greater detail below. Keep-alive message timing and acknowledgement message timing is performed for controlling process 201, and overall timing is performed for subordinate processes 203 and 205.

Timing for a given process is a service provided by the operating system associated with the given process. A timing action is started when the operating system is requested to return a time-out indication to the requesting program process after the lapse of a predetermined interval. The operating system starts a timer by storing data in a block of memory called a timer, such data including the associated process number, a program identifier discussed below, and the time-out time, i.e., current time plus the predetermined interval, after which the time-out indication will be generated. Timers are periodically examined by the operating system to check whether the current time, maintained by the operating system, exceeds the time-out time. If so, the process associated with a timer is informed by a time-out indication, which is an event message from the operating system.

The timing control data stored in the process control block 300 of each process identifies the associated timer used by the operating system to time for that process. When a timer is stopped, this timing control data is used by the operating system to find the associated timer and clear it prior to the lapse of the specified interval. When this occurs, no time-out indication for that timer is reported by the operating system. Sometimes, timing is restarted when a new timing request is made prior to the time-out time. When this occurs, the operating system is requested to stop the previous timer and to start a new one. If timing is restarted after a time-out, only a new timer need be started.

As previously mentioned, a timer contains the associated process number, time-out time, and program identifier. The time-out time is used to determine when a time-out event message is to be generated and sent, and the process number is used as the destination process number of the time-out event message. The program identifier returned to the associated process with a time-out event message informs that process of what action to take in response to the time-out event message. For example, a time-out report with one value of the program identifier will initiate the sending of a keep-alive message, and a report with a second value of the program identifier will initiate the deactivation of a process.

Figure 4:
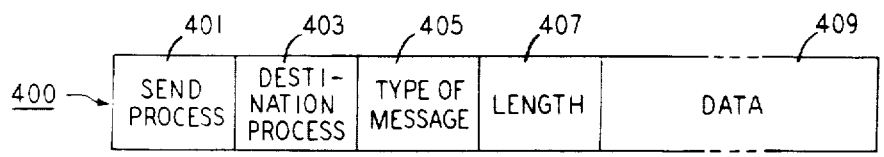
FIG. 4 represents the layout of data in a message.

In the present embodiment, processes communicate with each other by sending data messages. FIG. 4 shows the content of an interprocess data message. Data message 400 consists of four fixed length initial fields 401, 403, 405 and 407, and a variable length data field 409. The initial fields include the identification of the sending process 401, the identification of the destination process 403, the type of message 405, and the length of the message 407. In the present embodiment, two different values of the data in the type field 405 of a message are used to identify a keep-alive and an acknowledgement message. It should be noted that for keep-alive and acknowledgement messages, no data is required in the data field 409.

Figure 2:
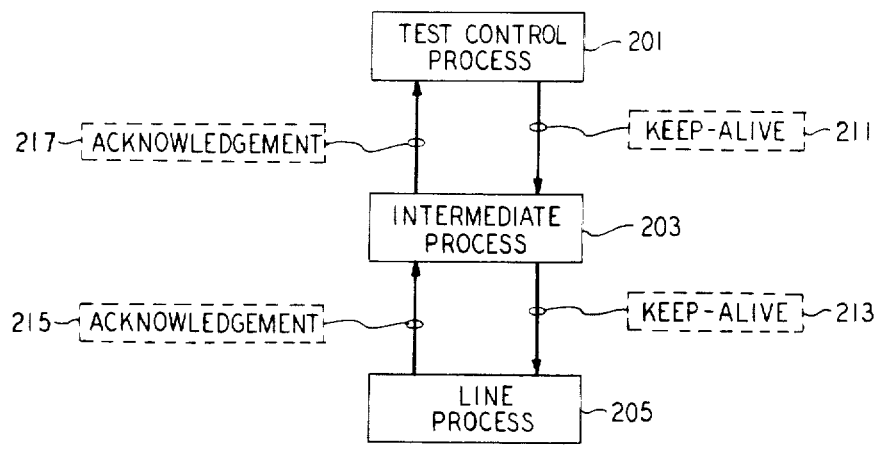
FIG. 2 illustrates how the processes controlling the test connection exchange keep-alive and acknowledgement messages.

FIG. 5 is a flow diagram of the timing and keep-alive message generation actions in the controlling process. The actions in the subordinate processes are shown in FIG. 6 and will be described later herein. When the maintenance craftsperson signals a request to the system, the request signal is detected by the operating system. The operating system responds to the request signal by activating test control process 201 (FIG. 2). The maintenance craftsperson's dialing signals are passed to the test control process 201 by the operating system. After the maintenance craftsperson has finished dialing, the controlling process 201 detects the need to add subordinate processes 203 and 205 (action box 511) since the subordinate processes are required in order to set up a connection to the line to be tested. The controlling process sends messages via its associated operating system to the operating systems of the subordinate processes (action box 512) to activate intermediate process 203 and line process 205 (FIG. 2). A connection through trunk unit 101 (FIG. 1), switch unit 103 and line unit 105 is set up under the control of processes 201, 203, and 205.

Sometime later, as indicated by the dashed lines, these connections are set up and the call configuration has reached a stable state. The call will remain in this state for an indeterminate length of time, in this case, until the maintenance craftsperson signals the completion of testing. This stable state is detected by line process 205, which sends a message to intermediate process 203 which sends a message to controlling process 201. Upon receipt of the stable state message (action box 513) the controlling process 201 requests its operating system to start a keep-alive message timer, (action box 515), typically set to time out after five minutes, in order to prevent the subordinate processes from timing out.

Although the present embodiment uses a fixed keep-alive message timing interval, a different keep-alive message timing interval can be used for the initial message and for subsequent messages. The requirement is that the keep-alive message timing interval be shorter than the corresponding overall timing interval by an interval adequate to allow time for the keep-alive messages to propagate down the chain of linked processes and the acknowledgement messages to propagate back up the chain.

When controlling process 201 subsequently receives a keep-alive message timer time-out report (action box 517) from its associated operating system, the controlling process generates and sends a keep-alive message (action box 519) to the next subordinate process linked to the controlling process (in the present example, intermediate process 203). An acknowledgement timer, typically set to time out after one minute, is started (action box 521) for the controlling process 201. The acknowledgement time is set to any value larger than the normal peak time required for a keep-alive message to propagate to the last process and for the acknowledgement message to propagate back to the first process. It is desirable to keep the acknowledgement time as low as possible to allow for a rapid time-out in case of trouble.

When an acknowledgement message is received (action box 531) by the controlling process, the acknowledgement timer is stopped (action box 533) and the keep-alive message timer is started again (action box 515) to establish the time to transmit the next keep-alive message. When no acknowledgement message is received by the controlling process 201, indicating some fault in the linkage among the subordinate processes or a fault within a subordinate process, controlling process 201 receives an acknowledgement time-out report (action box 523). The controlling process responds to such a time out report by requesting the operating system to deactivate the controlling process and release its associated resources (action box 525). The controlling process is also deactivated when it is determined that the process is no longer needed, i.e., when the controlling process receives an indication (action box 535) that the process is to be deactivated. In the present embodiment, such an indication is from a signal from the maintenance craftsperson at the local test desk that testing has been completed. After the controlling process 201 is deactivated, no further keep-alive messages are sent and the subordinate processes will be deactivated when their overall timers time out.

FIG. 6 is a flow diagram of the timing and message processing actions performed in the subordinate processes, i.e., line process 205 and intermediate process 203 (FIG. 2). A subordinate process is initially activated by its operating system (action box 623) upon receipt of a process activation message (action box 621) from the controlling process 201.

An overall timer, typically set to time out after six minutes, is started (action box 603) for a newly-activated subordinate process when a stable state is recognized (by process 205, action box 601) or a stable state message is received (by process 203, action box 602). In the present embodiment, a stable state exists when a connection has been set up between line 113 and trunk 111 (FIG. 1). The transition to a stable state is recognized by line process 205 (action box 601) when a message is received from its operating system confirming successful completion of the connection. Intermediate process 203 receives a stable state message (action box 602) from line process 205.

Although in the present embodiment overall timing is started when a stable state has been reached, other events can be used to initiate such timing. It is only necessary that the first keep-alive message be sent out and the corresponding acknowledgement message returned before a subordinate process times out. Also the initial overall timing interval may be different from subsequent intervals as previously discussed with reference to the keep-alive message generation timing interval.

When a keep-alive message is received (action box 611) before an overall time-out report is generated, a test (test 613) is performed to see if the receiving process is the last process in the series of linked processes. When the receiving process is not the last, i.e., is an intermediate process, a keep-alive message is sent (action box 615) to the next process, whose number is stored in the process control block (location 311, FIG. 3) of the receiving process. When the keep-alive message is received by the last process in the sequence, (in this example, line process 205), overall timing for the last process is restarted through a request to the operating system (action box 618) and an acknowledgement message is sent back to the previous process (action box 617) whose number is stored in the process control block (location 312, FIG. 3). When a subordinate process receives an acknowledgement message (action box 619), overall timing for this subordinate process is restarted (action box 618) and the acknowledgement message is sent back to the previous process of the series (action box 617).

If overall timing for a given subordinate process is not restarted before the overall time-out interval has elapsed, an overall time-out report from the operating system (action box 605) is received by the given subordinate process. A subordinate process responds to an overall time-out report by requesting its associated operating system to deactivate this subordinate process and release all associated resources (action box 609).

FIGS. 7 and 8 are flowcharts of actions similar to those of FIGS. 5 and 6, but represent a second embodiment of the invention. In this second embodiment, action messages as well as keep alive messages are used to maintain a subordinate process in the active state. Action messages include any messages that request data, write data, or request that some other data processing or control action be performed. The arrangement described for the second embodiment of the invention avoids the overhead of having to send keep-alive messages when action messages are sent.

The initial actions (action boxes 711, 712, 713) are the same as the initial actions (action boxes 511, 512, 513) of the process described with reference to FIG. 5. However, in this second embodiment, linkage data to each subordinate process is maintained in the process control block of the controlling process. Separate keep-alive message timer control data is originally initialized and started for each subordinate process (FIG. 7, action box 751). In FIG. 7, the term "process A" refers to any of the subordinate processes for which separate keep-alive message timers are kept. Separate keep-alive message time-out reports are received for each such subordinate process (action box 717), separate keep-alive messages are sent in response to these time-out reports (action box 719), separate acknowledgement timers are started (action box 721), separate acknowledgement messages received (action box 731), the separate acknowledgement timers are stopped (action box 733) and the separate keep-alive timers are restarted (action box 715). In addition, the sending of any action message to a process (action box 741) also restarts the keep-alive message timer for that process (action box 715). Any acknowledgement time-out report (action box 723) or the receipt of a deactivation indication (action box 735) leads to the deactivation of the controlling process and the release of its associated resources (action box 725).

In the subordinate process flow diagram of FIG. 8, which corresponds to the controlling process flow diagram of FIG. 7, the subordinate process is also activated by its operating system (action box 823) in response to a message from the controlling process (action box 821) as previously described with reference to FIG. 6. Overall timing is also initially started (action boxes 801, 802, 803) as previously described with reference to FIG. 6. Subsequently, when a keep-alive message is received (action box 811), an acknowledgement message is sent to the controlling process (action box 817) and the overall timer is restarted (action box 818). In addition, the overall timer is restarted in response to receipt of an action message from the controlling process (action box 831). Receipt of an overall time-out report (action box 805) leads to the deactivation of the subordinate process and the release of its associated resources (action box 809).

For some applications, it may be desirable to continue the task controlled by the controlling process even if a subordinate process is no longer active or properly linked. For example, if the controlling process monitors a telephone call and a subordinate process is a billing process, it is desirable to retain the telephone call even if the billing process is unlinked or deactivated. Under these circumstances, process deactivation in response to acknowledgement message time-out in the controlling process may be deleted. The subordinate process could then be arranged to respond to keep-alive messages by restarting timing without returning acknowledgement messages.

The use of keep-alive messages and acknowledgement messages not only provides an efficient method of safely maintaining a subordinate process active, but also checks the two directions of linkage within the series of processes. Alternatively, a circular linkage could be used in which the last process could transmit a keep-alive message directly to the controlling process. This would eliminate the need for acknowledgement messages. With a circular linkage, the return of the keep-alive message to the controlling process verifies the integrity of the linkage.

It is not necessary that the source of keep-alive messages be a controlling process. Any process can be used to generate these messages. If a two-way linkage is used, as described herein, it is more convenient if the source of the keep-alive messages is the first member of the two-way link, though this is not necessary.

In the present embodiment, each of the linked processes executes on a different processor. In other embodiments, two or more of the processes may execute on the same processor.

It is to be understood that the above-described embodiment is merely illustrative of the principles of this invention; other arrangements may be devised by those skilled in the art without departing from the spirit and scope of the invention. For example, initial overall timing in a subordinate process could be started via a message from a controlling process.

What is claimed is:

1. In a multiprocessing system, a method of deactivating a program process comprising the steps of:
   starting an overall timer, set to time out after a first predetermined period of time, for said program process;
   executing said program process as a plurality of tasks interposed between a plurality of real time breaks;
   determining whether there is a need to maintain said program process active;
   starting a keep-alive message timer set to time out after a second predetermined period of time during one of said plurality of real time breaks if it is determined that there is a need to maintain said program process active, said second predetermined of time being less than said first predetermined period of time;
   repetitively generating and sending a keep-alive message to said program process and repetitively restarting said keep-alive message timer when said keep-alive message timer was most recently started more than said second predetermined period of time in the past;
   receiving said keep-alive message in said program process;
   restarting said overall timer when said program process receives said keep-alive message;
   terminating said step of repetitively generating and sending and repetitively restarting when it is determined that there is no longer a need to maintain said program process active; and
   deactivating said program process when said overall timer was most recently started more than said first predetermined period of time in the past.

2. The method in accordance with claim 1 further comprising the steps of:

sending an action message to said program process;

restarting said keep-alive message timer when said action message is sent;

receiving said action message in said program process; and restarting said overall timer when said program process receives said action message.

3. The method in accordance with claim 1, in which said step of starting an overall timer comprises the steps of:

receiving in said program process a message indicating that said program process is in a stable state; and starting said overall timer, set to time out after said first predetermined period of time, for said program process when said program process receives said message indicating that said program process is in a stable state.

4. In a multiprocessing system comprising a controlling program process and a subordinate program process, a method of deactivating program processes comprising the steps of:

starting an overall timer, set to time out after a first predetermined period of time, for said subordinate process;

executing said subordinate program process as a plurality of tasks interposed between a plurality of real time breaks;

determining whether there is a need to maintain said subordinate program process active;

starting a keep-alive message timer set to time out after a second predetermined period of time for said controlling program process during one of said plurality of real time breaks if it is determined that there is a need to maintain said subordinate program process active, said second predetermined period of time being less than said first predetermined period of time;

repetitively generating and sending a keep-alive message from said controlling program process to said subordinate program process and repetitively restarting said keep-alive message timer when said keep-alive message timer was most recently started more than said second predetermined period of time in the past;

receiving said keep-alive message in said subordinate program process;

restarting said overall timer when said subordinate program process receives said keep-alive message;

terminating said step of repetitively generating and sending and repetitively restarting when it is determined that there is no longer a need to maintain said subordinate process active; and deactivating said subordinate program process when said overall timer was most recently started more than said first predetermined period of time in the past.

5. The method in accordance with claim 4 further comprising the steps of:

starting an acknowledgement timer, set to time out after a third predetermined period of time, for said controlling program process when said step of generating and sending said keep-alive message is performed;

sending an acknowledgement message from said subordinate program process to said controlling program process when said subordinate program process receives said keep-alive message;

receiving said acknowledgement message in said controlling program process;

stopping said acknowledgement timer when said controlling program process receives said acknowledgement message; and deactivating said controlling program process when said acknowledgement timer is not stopped and was most recently started more than said third predetermined period of time in the past.

6. The method in accordance with claim 5 further comprising the steps of:

restarting said keep-alive message timer when said controlling program process receives said acknowledgement message;

repetitively generating and sending a keep-alive message from said controlling program process to said subordinate program process when said keep-alive message timer was most recently started more than said second predetermined period of time in the past and repetitively restarting said keep-alive message timer when said controlling program process receives an acknowledgement message;

determining when there is no longer a need to maintain said subordinate program process active; and terminating said step of repetitively generating and sending and repetitively restarting when it is determined that there is no longer a need to maintain said subordinate process active.

7. The method in accordance with claim 4 further comprising the steps of:

sending an action message from said controlling program process to said subordinate program process;

restarting said keep-alive message timer when said action message is sent;

receiving said action message in said subordinate program process; and restarting said overall timer when said subordinate program process receives said action message.

8. The method in accordance with claim 4, in which said step of starting an overall timer comprises the steps of:

receiving a message in said subordinate program process indicating that said subordinate program process is in a stable state; and starting said overall timer, set to time out after said first predetermined period of time, for said subordinate program process when said subordinate program process receives said message indicating that said subordinate program process is in a stable state.

9. In a multiprocessing system comprising a first program process, at least one intermediate program process, and a last program process, a method of deactivating program processes, comprising the steps of:

linking said program processes in a sequence from said first program process to said last program process such that each of said program processes except said last program process has an associated next program process and each of said program processes except said first program process has an associated previous program process;

starting an overall timer, set to time out after a first predetermined period of time for said last program process;

generating and sending a keep-alive message from said first program process to the next program process associated with said first program process before said overall timer times out;

receiving a keep-alive message in each of said intermediate processes and sending a keep-alive message from each of said intermediate program processes to the next program process associated with that intermediate program process when that intermediate program process receives a keep-alive message;

receiving a keep-alive message in said last program process;

restarting said overall timer for said last program process when said last program process receives a keep-alive message; and deactivating said last program process when said overall timer was most recently started more than said first predetermined period of time in the past.

10. The method in accordance with claim 9 further comprising the steps of:

sending an acknowledgement message to the previous process associated with said last program process when said last program process receives a keep-alive message;

receiving an acknowledgement message in each of said intermediate processes and sending an acknowledgement message from each of said intermediate program processes to the previous program process associated with that intermediate program process when that intermediate program process receives an acknowledgement message;

starting an overall timer set to time-out after said first predetermined period of time, for one of said intermediate program processes;

restarting said overall timer for said one of said intermediate program processes when said one of said intermediate program processes receives an acknowledgement message; and deactivating said one of said intermediate program processes when said overall timer associated with said one of said intermediate program processes was most recently started more than said first predetermined period of time in the past.

11. The method in accordance with claim 9 further comprising the steps of:

starting an acknowledgement timer set to time out after a second predetermined period of time, for said first program process, when said step of generating and sending a keep-alive message is performed;

sending an acknowledgement message to the previous process associated with said last program process when said last program process receives a keep-alive message;

receiving an acknowledgement message in each of said intermediate processes and sending an acknowledgement message from each of said intermediate program processes to the previous program process associated with that intermediate program process when that intermediate program process receives an acknowledgement message;

receiving an acknowledgement message in said first program process;

stopping said acknowledgement timer when said acknowledgement message is received by said first program process; and deactivating said first program process when said acknowledgement timer is not stopped and was most recently started more than said second predetermined period of time in the past.

12. The method in accordance with claim 9 wherein said step of generating and transmitting a keep-alive message from said first program process comprises the steps of:

starting a keep-alive message timer set to time out after a second predetermined period of time, for said first program process, said second predetermined period of time being less than said first predetermined period of time; and generating and sending a keep-alive message from said first program process to the next program process associated with said first program process when said keep-alive message timer was most recently started more than said second predetermined period of time in the past.

13. The method in accordance with claim 12 further comprising the steps of:

sending an acknowledgement message to the previous process associated with said last program process when said last program process receives a keep-alive message;

receiving an acknowledgement message in each of said intermediate processes and sending an acknowledgement message from each of said intermediate program processes to the previous program process associated with that intermediate program process when that intermediate program process receives an acknowledgement message;

receiving an acknowledgement message in said first program process;

restarting said keep-alive message timer when said first program process receives said acknowledgement message;

repetitively generating and sending a keep-alive message from said first program process to said last program process when said keep-alive message timer was most recently started more than said second predetermined period of time in the past and repetitively restarting said keep-alive message timer when said first program process recevies an acknowledgement message;

determining when there is no longer a need to maintain said last program process active; and terminating said step of repetitively generating and sending and repetitively restarting when it is determined that there is no longer a need to maintain said last process active.

14. The method in accordance with claim 9, in which said step of starting an overall timer comprises the steps of:

receiving a message, indicating that said last program process is in a stable state, in said last program process; and starting said overall timer, set to time out after said first predetermined period of time, for said last program process, when said last program process receives said message indicating that said last program process is in a stable state.

15. In a multiprocessing system comprising a first program process, at least one intermediate program process, and a last program process, a method of deactivating a program process, comprising the steps of:

linking said program processes in a sequence from said first program process to said last program process such that each of said program processes except said last program process has an associated next program process and each of said program processes except said first process has an associated previous program process;

starting an overall timer, set to time out after a first predetermined period of time, for one of said intermediate program processes;

starting an acknowledgement timer, set to time out after a second predetermined period of time, in said first program process;

generating and sending a keep-alive message from said first program process to the next program process associated with said first program process before said overall timer times out;

receiving a keep-alive message in each of said intermediate processes and sending a keep-alive message from each of said intermediate program processes to the next program process associated with that intermediate program process when that intermediate program process receives a keep-alive message;

receiving a keep-alive message in said last program process;

sending an acknowledgement message to the previous program process associated with said last program process when said last program process receives a keep-alive message;

receiving an acknowledgement message in each of said intermediate processes and sending an acknowledgement message from each of said intermediate program processes to the previous program process associated with that intermediate program process when that intermediate program process receives an acknowledgement message;

receiving an acknowledgement message in said first program process and stopping said acknowledgement timer of said first program process;

deactivating said first program process when said acknowledgement timer is not stopped and was most recently started more than said second predetermined period of time in the past;

restarting said overall timer for said one of said intermediate program processes when said one of said intermediate program processes receives said acknowledgement message; and deactivating said one of said intermediate program processes when said overall timer was most recently started more than said first predetermined period of time in the past.

16. The method in accordance with claim 15 wherein said step of generating and sending a keep-alive message from said first program process further comprises the steps of:

starting a keep-alive message timer set to time out after a third predetermined period of time for said first program process, said third predetermined period of time being less than said first predetermined period of time; and generating and sending a keep-alive message from said first program process to the next program process associated with said first program process when said keep-alive message timer was most recently started more than said third predetermined period of time in the past.

17. In a multiprocessing system comprising a first program process, at least one intermediate program process, and a last program process, a method of deactivating program processes, comprising the steps of:

linking said program processes in a sequence from said first program process to said last program process such that each of said program processes except said last program process has an associated next program process;

starting an overall timer, set to time out after a first predetermind period of time, for said last program process;

generating and sending a keep-alive message from said first program process to the next program process associated with said first program process before said overall timer times out;

receiving a keep-alive message in each of said intermediate processes and sending a keep-alive message from each of said intermediate program processes to the next program process associated with that intermediate program process when that intermediate program process receives a keep-alive message;

receiving a keep-alive message in said last program process;

restarting said overall timer for said last program process when said last program process receives a keep-alive message; and deactivating said last program process when said overall timer was most recently started more than said first predetermined period of time in the past.

18. The method in accordance with claim 17 wherein said step of generating and transmitting a keep-alive message from said first program process comprises the steps of:

starting a keep-alive message timer set to time out after a second predetermined period of time, for said first program process, said second predetermined period of time being less than said first predetermined period of time; and generating and sending a keep-alive message from said first program process to the next program process associated with said first program process when said keep-alive message timer was most recently started more than said second predetermined period of time in the past.

* * * * *

UNITED STATES PATENT AND TRADEMARK OFFICE
CERTIFICATE OF CORRECTION

PATENT NO. : 4,635,187

DATED : January 6, 1987

INVENTOR(S) : Baron, Donna M., Espenlaub, David E., Haines, Vicki A., Inberg, Gerald A., Shilling, Steve A., Truesdale, James B., Willett, Robert J.

It is certified that error appears in the above-identified patent and that said Letters Patent is hereby corrected as shown below:

Column 12, claim 9, line 63, after "time", insert a comma.

Column 14, claim 13, line 41, change "recevies" to --receives--.

Signed and Sealed this

Twenty-seventh Day of October, 1987

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,635,187
DATED : January 6, 1987
INVENTOR(S) : Donna M. Baron et al It is certified that error appears in the above-identified patent and that said Letters Patent is hereby corrected as shown below:

Column 10, claim 1, line 47, "predetermined of times" should read -- predetermined period of time --.

Column 12, claim 9, line 63, after "time", insert a comma.

Column 14, claim 13, line 41, "recevies" should read -- receives --.

This certificate supersedes Certificate of Correction issued October 27, 1987.

Signed and Sealed this

Second Day of February, 1988

Attest:

DONALD J. QUIGG

*Attesting Officer*  *Commissioner of Patents and Trademarks*